United States Patent [19]
Gannon et al.

[11] Patent Number: 5,317,705
[45] Date of Patent: May 31, 1994

[54] APPARATUS AND METHOD FOR TLB PURGE REDUCTION IN A MULTI-LEVEL MACHINE SYSTEM

[75] Inventors: Patrick M. Gannon; Peter H. Gum, both of Poughkeepsie; Roger E. Hough, Highland; Robert E. Murray, Woodstock, all of N.Y.

[73] Assignee: International Business Machines Corporation, Armonk, N.Y.

[21] Appl. No.: 112,174

[22] Filed: Aug. 26, 1993

Related U.S. Application Data

[63] Continuation of Ser. No. 605,192, Oct. 24, 1990, abandoned.

[51] Int. Cl.5 .............................................. G06F 12/02
[52] U.S. Cl. ..................................... 395/400; 395/425; 364/DIG. 1; 364/228.2; 364/232.1; 364/255.7; 364/256.4
[58] Field of Search ............... 395/425, 400; 364/200 MS File, 900 MS File

[56] References Cited

U.S. PATENT DOCUMENTS

| | | | |
|---|---|---|---|
| 4,068,303 | 1/1978 | Morita | 395/400 |
| 4,456,954 | 6/1984 | Bullions, III et al. | 364/200 |
| 4,695,950 | 9/1987 | Brandt et al. | 395/400 |
| 4,733,348 | 3/1988 | Hiraoka et al. | 364/200 |
| 4,779,188 | 10/1988 | Gum et al. | 364/200 |
| 4,792,895 | 12/1988 | Tallman | 395/375 |
| 4,792,897 | 12/1988 | Gotou et al. | 395/400 |
| 4,816,991 | 3/1989 | Watanabe et al. | 395/400 |
| 4,849,881 | 7/1989 | Eguchi | 364/200 |
| 4,876,646 | 10/1989 | Gotou et al. | 395/400 |
| 5,101,346 | 3/1992 | Ohtsuki | 395/800 |
| 5,129,071 | 7/1992 | Yamagata et al. | 395/400 |

FOREIGN PATENT DOCUMENTS 63-286944 11/1988 Japan ......................... G06F 12/10

OTHER PUBLICATIONS

TDB, vol. 19, No. 7, Dec. 1976, "Table Lookaside Buffer with Selective Space Invalidation"/M. Kerrigan and J. Newman.

Primary Examiner—Joseph L. Dixon
Assistant Examiner—Hiep T. Nguyen
Attorney, Agent, or Firm—Bernard M. Goldman

[57] ABSTRACT

A system for reducing purging of a translation lookaside buffer (TLB) to reduce operating system overhead in a system running multiple levels of virtual machines. A system typically must purge TLB entries whenever an underlying page table entry is invalidated due to paging activity on the host machine, or an underlying guest machine. A system for reducing the number of cases in which guest translations are based on host page table entries is provided. Additional logic is supplied to analyze each invalidate page table entry (IPTE) instruction to minimize the extent of purging required as a result of that instruction. When the region relocate facility is in operation, or when no pageable TLB's have been constructed, only the entry corresponding to the page table entry to be invalidated need be purged. This limited purging reduces the overhead by reducing the time spent in purging and the time required in address translation to rebuild the TLB. This time saving results in increased performance in systems with multi-level guests.

5 Claims, 3 Drawing Sheets

FIG. 5

STATE OF PROCESSOR EXECUTING IPTE → ACTION TAKEN WHEN A PROCESSOR (CP) EXECUTES AN INVALIDATE PAGE TABLE ENTRY INSTRUCTION

ACTION TAKEN IN →

| INDICATOR STATES | | LEVEL 0 HOST | | LEVEL 1 GUEST | | LEVEL 2 GUEST | |
|---|---|---|---|---|---|---|---|
| RRF | PGWP | THIS CP | OTHERS | THIS CP | OTHERS | THIS CP | OTHERS |
| 0 | 0 | IPTE | IPTE | IPTE | IPTE | IPTE | IPTE |
| 0 | 1 | PURGE | PURGE | IPTE | IPTE | IPTE | IPTE |
| 1 | 0 | IPTE | IPTE | IPTE | IPTE | IPTE | IPTE |
| 1 | 1 | IPTE | IPTE | PURGE | *PURGE | IPTE | IPTE |

*PURGE WILL ONLY TAKE PLACE IF THE STATE DESCRIPTOR SPECIFIES THAT THE LEVEL 1 GUEST IS ALLOWED TO HAVE LEVEL 2 GUESTS AND THE LEVEL 1 GUEST IS MULTI-PROCESSOR GUEST.

-THE RRF INDICATOR IN A CP IS SET WHEN A LEVEL 1 GUEST IS INITIATED IN RRF MODE AND IS RESET WHEN THE TLB IS PURGED DURING NON-RRF MODE.

-THE PGWP (PAGEABLE GUEST WAS PROCESSED) INDICATOR IN A CP IS SET WHEN A TRANSLATION RESULT IS ENTERED INTO THE TLB FOR A PAGEABLE GUEST AND IS RESET WHEN THE TLB IN THAT CP IS PURGED.

APPARATUS AND METHOD FOR TLB PURGE REDUCTION IN A MULTI-LEVEL MACHINE SYSTEM

CROSS-REFERENCE TO RELATED APPLICATION

This application is a continuation of application Ser. No. 07/605,192, filed Oct. 24, 1990, now abandoned.

BACKGROUND OF THE INVENTION

1. Field of the Invention

The present invention relates to computer systems and, more particularly, to virtual machine systems which provide for instruction processing in multiple levels of virtual machines. More particularly, the present invention is directed to the efficient use of a translation lookaside buffer (TLB) for address translation.

2. Description of the Prior Art

Mainframe computer systems such as the IBM 3090 computer system comprise a plurality of processors and large random access and sequential access storage devices. These large systems ar capable of processing a large number of tasks in a short period of time. It is frequently desirable to divide this host processing power into separate partitions or "virtual machines" that can be operated by different users. The division is accomplished by the use of host control program softward such as the IBM Virtual Machine/Extended Architecture (VM/XA) system product. Each of the virtual machines defined above can accept a "guest" operating system that may be different from the host operating system. Thus, for example, if the host is running the VM/XA operating system, the guest could operate the IBM MVS/XA system program. The guest virtual machines may in turn be divided into additional virtual machines for performance of certain tasks.

The host control program or operating system is typically referred to as the level 0 machine. A guest operation on the host is typically referred to as a level 1 guest and guests built upon the first guest as level 2 guest systems. The operating systems operating at levels 1 or 2 issue instructions that, they believe, are causing a real access to a processor or memory. The IBM System/370 architecture manages this through a process known as interpretive execution of the virtual machine instructions. The System/370 architecture is described in the IBM Publication GA22-7000. The IBM System/370-XA implementation of interpretive execution is described in IBM Publication SA22-7095.

Interpretive execution requires the translation of instructions and memory addresses from the guest machine to the underlying real machine and real storage. An example of the translations required is the translation of memory addresses from the guest machine to real storage. U.S. Pat. No. 4,456,954, issued on June 26, 1984 and assigned to the assignee of this application, describes interpretive execution and address translation under interpretive execution and is incorporated herein by reference.

The host machine initiates a guest operating system through a Start Interpretive Execution (SIE) instruction. The SIE instruction invokes interpretive execution hardware in the host causing the host to enter interpretive execution mode for the purpose of executing a program in a level 1 guest. SIE provides for the mapping of addresses by the level 1 virtual machine. In a like manner, a level 1 guest can be a host for a level 2 guest.

Each virtual machine to be operated as a guest of the host machine is described in a state description maintained in real storage. When an SIE instruction is encountered, the state description is used to establish the virtual machine environment for execution. At the same time, the existing host environment must be saved so it can be restored upon exit from the virtual machine. Upon completion of the SIE instruction, the current status of the guest virtual machine must be stored in the state description and the previous host environment restored to the real machine.

Among the interpretive execution facilities are dynamic address translation and guest timing services. Dynamic address translation is the process which translates a guest virtual address into a host real address allowing access to the real storage in the machine. The IBM System/370 employs a virtual memory mechanism in which real memory is divided into pages of a constant size, e.g., 4K bytes, which are addressed by segment and page indices. Thus, the virtual address of a memory location will be represented as a segment table index value, a page table index value, and a displacement within the page. To locate the actual data, the segment table, page table, and memory page must each be accessed. If the virtual address is specified in a guest operating system, the address that guest believes to be a real address must be further translated by the lower level guests and the host machine. As a result, several steps of address translation must occur as shown by the arrows in FIG. 3.

Address translation can be made more efficient by the use of a translation lookaside buffer (TLB). The translation lookaside buffer captures the results of dynamic address translation and provides a shortcut for future guest address translations. The TLB has a limited capacity, so only a certain number of recent translations are maintained (e.g. 512). The System/370 hardware provides the ability to test whether or not a translation from virtual to real for the virtual address request is available in the TLB. If the translation is available, it is used and dynamic address translation is bypassed. This can result in significant time savings. The translation lookaside buffer maintains several pieces of information including an indicator of whether the entry is for the host system or a guest, the logical address translated, the real address that resulted from the translation, and the segment table origin (STO) address of the logical address.

SUMMARY OF THE INVENTION

The present invention is directed to improving the performance of the translation lookaside buffer (TLB) by reducing the purging of the entire TLB through a more effective analysis of the requirement for purging.

The present invention is directed to improvements in operating system operation where multiple levels of virtual machines are being run on one or more real processors with real storage capable of being allocated to a particular virtual machine. The present invention is directed to providing a means to detect and process an invalidate request for a particular TLB entry. All entries in the TLB are purged only if the purge request originated in a host processing system and a pageable guest was processed such that there may be guest TLB entries based on the host Page Table Entry being invalidated. Otherwise, only the single table entry is purged.

BRIEF DESCRIPTION OF THE DRAWINGS

FIG. 5 is a table illustrating the decision process followed when purging the TLB.

DETAILED DESCRIPTION OF THE PREFERRED EMBODIMENT

Figure 1:
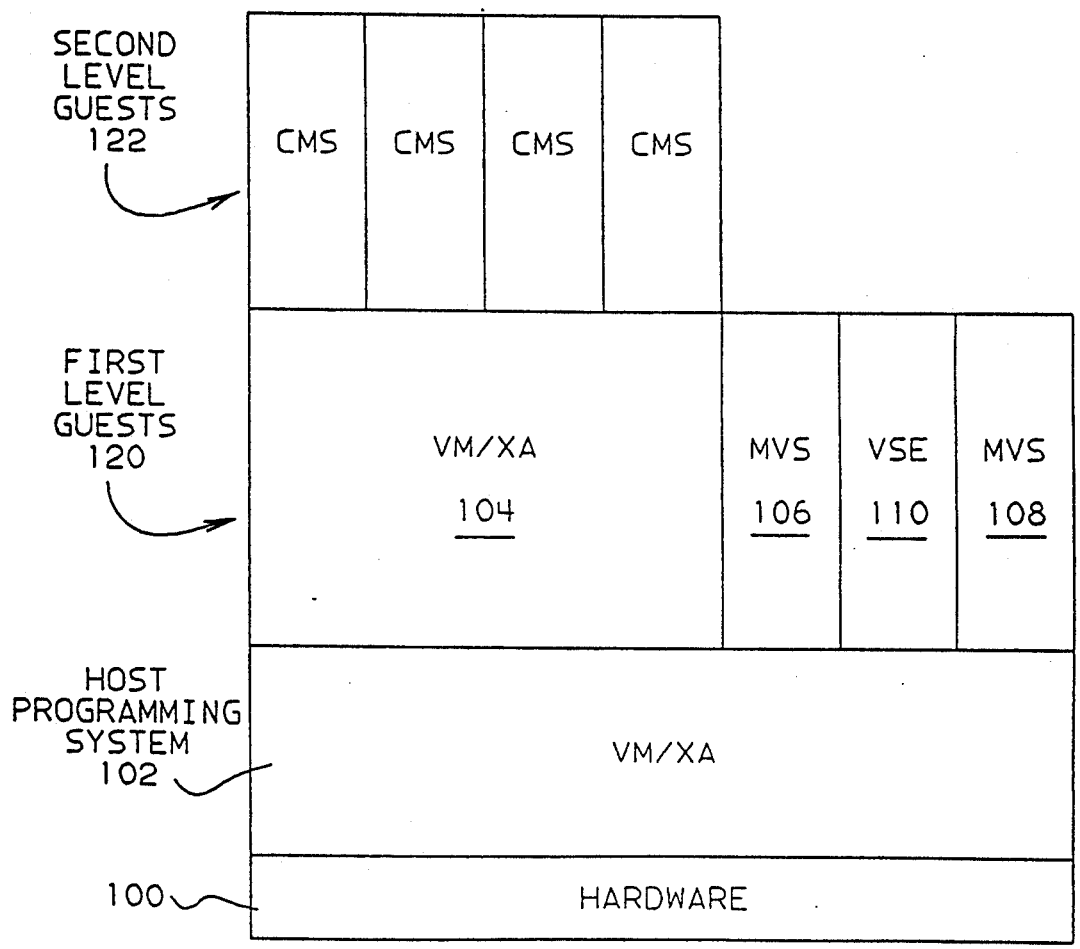
FIG. 1 is a block diagram showing the relationships of multiple levels of guest operating systems to the underlying hardware.

FIG. 1 illustrates the software environment in a computer system that is capable of operating multiple levels of virtual machines. A host programming system such as the IBM VM/XA system program allows hardware 100 to be operated with multiple levels of virtual machines (VM/XA is a trademark of IBM Corporation). At the first level, virtual machines can operate with a variety of operating systems such as the IBM VM/XA system program 104, the IBM MVS system program 106 and 108, or IBM VSE system program 110. These are generally referred to as the first level guests 120. When a product such as the IBM VM/XA system program 104 is run at the first level, a second level of guests 122 may be defined by that system. These guests may operate additional operating systems or support user programs such as IBM Conversational Monitor System (CMS) program product.

Figure 2:
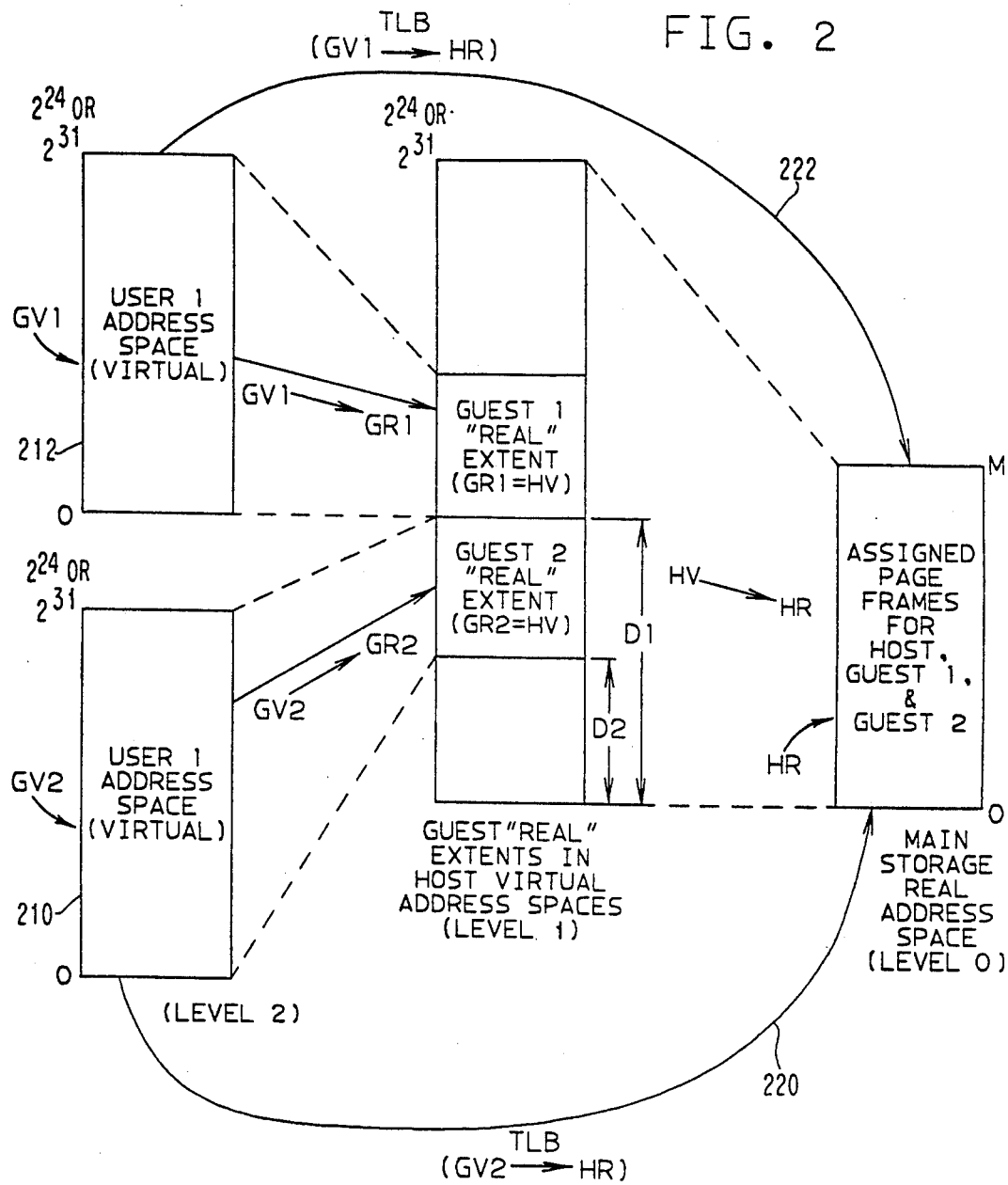
FIG. 2 is a block diagram showing the relationship of guest and host virtual address spaces.

One of the important functions of the host operating system supporting multiple levels of virtual machines is the translation of virtual memory addresses from the higher level virtual machine address spaces to the real memory addresses of the hardware. This is typically accomplished using a process known as dynamic address translation. Address translation accepts a guest virtual address and translates it into a host absolute address for memory access. Address translation is conceptually shown in FIG. 2. Second level guest address spaces are shown generally at 210 and 212. The address spaces 210 212 are operated upon by the second level guests as though they were virtual storage directly mapped to real storage. Virtual storage is typically divided into pages or a fixed size, for example, 4K bytes. Each of these pages can be assigned to real memory or, if necessary, be paged to another, slower storage medium such as disk.

The pages in a virtual memory system are organized into segments. A particular memory address is identified by a segment table index, a page table index, and a displacement within the page. The entry located by the segment table index is the address of the page table in real memory. The page table entry is the address of the page in real memory.

Multiple levels of virtual machines result in multiple step translation requirements. A level one guest will have guest segment and page tables which in turn will refer to the host segment and pages tables. A second level guest will have second level segment and page tables, first level segment and page tables and host segment and page tables.

Figure 3:
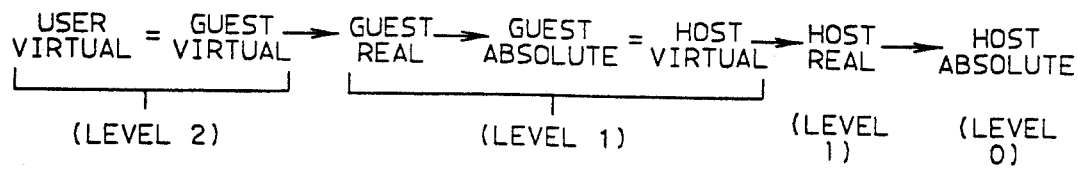
FIG. 3 illustrate the steps in address translation for multi-level guest systems.

The stages of address translation are shown in FIG. 3. A second level guest provides a user virtual address or a guest 2 virtual address. This is first translated into a level 2 guest real address which, using segment and pages tables, is translated into a level 1 guest absolute address that is equivalent to a host virtual address. The host virtual address is translated into a level 0 host real address which in turn is translated into a host absolute address.

Figure 4:
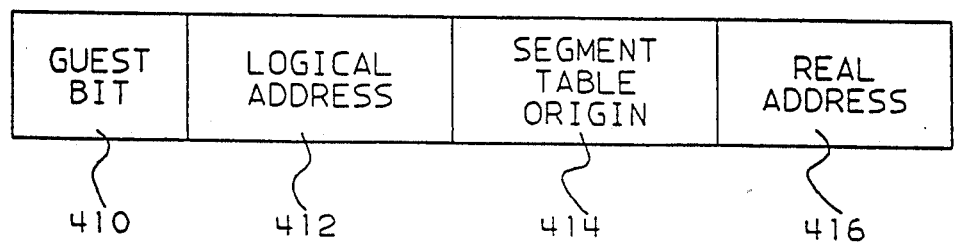
FIG. 4 is an example of the layout of a TLB entry according to the preferred embodiment of the present invention.

Address translation through these many steps is time consuming and slows the performance of the processor. To speed address translation, a translation lookaside buffer is implemented. The translation lookaside buffer (TLB) maintains a list of recently completed translations supporting direct translation from guest virtual to host real addresses. This eliminates several steps in the translation process. The effect of the bypass is shown at 220 and 222 in FIG. 2. FIG. 4 shows an example of TLB according to the preferred embodiment of the present invention. An entry in the TLB according to the preferred embodiment has a guest bit indicating whether this virtual address is in a guest virtual machine or the level 0 machine. The virtual address 412 is entered along with the relevant segment table origin 414. The resulting page frame real address 416 is also stored.

The IBM 3090 processors which can be operated according to the present invention, have 512 TLB entries. Excessive purging of the TLB results in loss of performance due to the time required for purging as well as the added address translation time required to rebuild the TLB.

During operation of the virtual memory system, when the system requires real space for an operating task, those pages which have not been recently used are paged out to a slower storage medium such as disk. When a page is paged out of real memory, the page table entry is invalidated. As a result of this paging activity, any translation based on that page table entry and stored in the TLB becomes invalid. When the system pages out a page frame it will issue an invalidate page table entry (IPTE) instruction to the TLB which causes entries associated with that page table to be invalidated or purged.

When the system is operating only a host operating system with no guests, the IPTE instruction simply invalidates the TLB entry associated with the page index specified by that instruction. Thus, only the TLB entry having that particular page frame real address is purged. However, when multiple levels of pageable guests are involved, there are circumstances where a number of host or guest TLB entries may be based upon a particular host page table entry, i.e., any host entry based on that page table entry and any guest entry that used that host page table entry in its translation. The guest TLB entries do not contain any indication of which host page table entry was used in the translation. Thus, if a pageable translation has been done since the last TLB purge and the IPTE instruction is executed, the entire TLB is purged to make sure that no potentially invalid guest entries remain. Where there are second level guests operating, the picture is even more complicated, raising more situations in which the entire TLB must be purged. Finally, in a multiprocessor system, the TLB must be purged not only for the executing processor but also for all other processors in a multiprocessor configuration.

In the preferred embodiment of the present invention, a facility is provided to allow the host operating system to allocate regions of real memory to each level 1 quest virtual machine. This region relocate facility RRF establishes explicit zones for the designated guest 1 virtual machines and defines a portion of absolute main storage to represent guest 1 absolute storage. When the region relocate facility is on, the address translation from guest absolute storage into host address space is not required. Thus, the host segment table and host page table entries do not effect address translation for these guests. A guest absolute address is translated into a host absolute address simply by adding the zone origin. Paging activities that invalidate host page table entries, therefore, have no effect on the guests that are run in region relocation mode.

The region relocate facility indicator is set whenever a first level guest is initiated with region relocate facility designated in the state description block. This type of first level guest is allowed to initiate second level guests that will be interpreted. The region relocate facility indicator is reset when the TLB is purged and the region relocate facility mode is off. Region relocate facility mode remains on while the region relocate facility first level guest is running and while any second level guests are running.

The present invention is directed to minimizing purging of the TLB when such purging is not required. The present invention operates in response to an invalidate page table entry (IPTE) instruction. The system examines the source of the IPTE instruction and designates whether it originated from the host level or from the first or second level guest. In addition, a determination of the processor relationship in a multiprocessor configuration is made. Next the system tests whether a pageable guest was processed since the last TLB purge. If no pageable guest was processed, then no additional TLB entries have been added and a purge is not required. Finally, a determination is made as to whether the region relocate facility is activated for a particular guest. RRF can be designated for each level 1 guest in the corresponding state description.

A decision table showing the processing logic is shown in FIG. 5. As a result of this logic, the entire TLB is purged only in those situations where it is necessary. In all other cases, only the single page table entry is purged. This represents a reduction from the amount of purging that would occur in prior art systems and leads to improved system performance.

The only time a full TLB purge is required is when the host page being invalidated may have been used in the formation of a pageable first level guest TLB entry or when a guest 1 page table entry being invalidated may have been used in the formation of a pageable level 2 TLB entry. If the region relocate facility indicator is on, the last first level guest was run in RRF mode and no pageable TLB entries were formed for that guest and thus the TLB does not need to be purged. If the region relocate facility is off and the pageable guest was processed (PGWP) indicator is set, the last first level guest may have formed TLB entries based on the host page table entry being invalidated and thus, the entire TLB must be purged.

In multiprocessing mode, the state description designates whether the first level guest is allowed to run pageable second level guests. There is also an indicator designating whether the first level guest is a multiprocessor guest. These two entries are checked to determine whether an IPTE instruction generated by a processor needs to cause TLB purges in other processors in a multiprocessor complex.

When the IPTE is initiated by a second level guest, there is never a danger that the page being invalidated was used as a host page since the second level cannot be host to any other interpretive guests. Thus, the action in the processor and other processors in a multiprocessor complex is to simply invalidate the designated TLB entry.

While the invention has been particularly shown and described with reference to the preferred embodiments thereof, it will be understood by those skilled i- the art that the foregoing and other changes in form and detail may be made therein without departing from the spirit and scope of the invention.

What is claimed is:

1. A computer system having a real processor and a random access memory, the computer system having a host hypervisor operating with virtual machines, and guests operating in any address translation mode of: a virtual=fixed guest, a virtual=real guest and a pageable guest, the system comprising
    translation lookaside buffer means in the processor for storing guest-translated virtual addresses and associated absolute addresses provided for virtual machines executing at plural guest address translation levels,
    a region relocation facility (RRF) mode indicator which is set on when the memory is divided into fixed contiguous memory locations for use by different virtual=fixed guests,
    a pageable-guest-was-processed (PGWP) indicator associated with the buffer means, the PGWP indicator being set on when a pageable guest's address translation information is stored in any entry in the buffer means, and the PGWP indicator being set of when the buffer means is purged by invalidation of all entries in the buffer means,
    means for signalling to the buffer means an invalidation request provided by a program, the request containing a table index for locating entry(s) in the buffer means to be invalidated and indicating a particular translation level for the request,
    means responsive to the signalling means for invalidating all entries in the buffer means upon detecting predetermined combined settings of the PGWP indicator and the region relocation facility mode indicator, and the signalling means indicating a translation level other than a lowest guest translation level.

2. A computer system for operating plural levels of virtual machines (guests) as defined in claim 1, further comprising
    means responsive to the signalling means for only invalidating entry(s) located in the buffer means by the table index provided by the signalling means upon the existence of particular predetermined combined states of the PGWP indicator, the region relocation facility mode indicator and the signalling means indicating any translation level.

3. A computer system for operating plural levels of virtual machines (guests) as defined in claim 1, further comprising
    a plurality of processors provided in the computer system, each processor having a respective buffer means for containing address translations of all translation levels,
    means for the host hypervisor and any of the guests to execute a buffer invalidation instruction on any one of the processors to invalidate all entries in the buffer means of the associated processor and to invalidate only entries in the buffer means located by the table index in the manner defined in claim 1, and means for transferring invalidation signals from the processor executing the buffer invalidation instruction to other processors in the computer system for the other processors to invalidate any corresponding buffer entry(s) located by the table index in any other processor in the computer system.

4. A computer system for operating plural levels of virtual machines (guests) as defined in claim 1, further comprising:

means for actuating the invalidation means to invalidate all entries in the buffer means associated with the processor when the PGWP indicator is set on and the region relocation mode indicator is set off.

5. A computer system for operating plural levels of virtual machines (guests) as defined in claim 1, further comprising:

means for actuating the invalidation means to invalidate all entries in the buffer means associated with the processor when both the PGWP mode indicator and the region relocate mode indicator are set on for a virtual=fixed guest which is allowed to have guests.

* * * * *